(No Model.)
H. B. ROBISCHUNG.
BRAKE BEAM AND REINFORCING CLAMP THEREFOR.
No. 528,238. Patented Oct. 30, 1894.
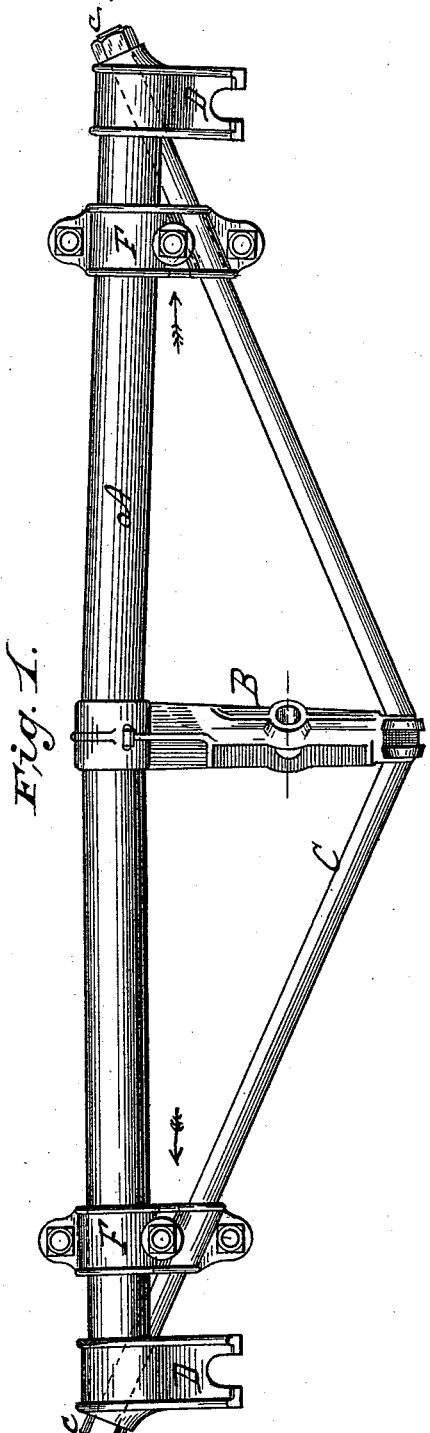
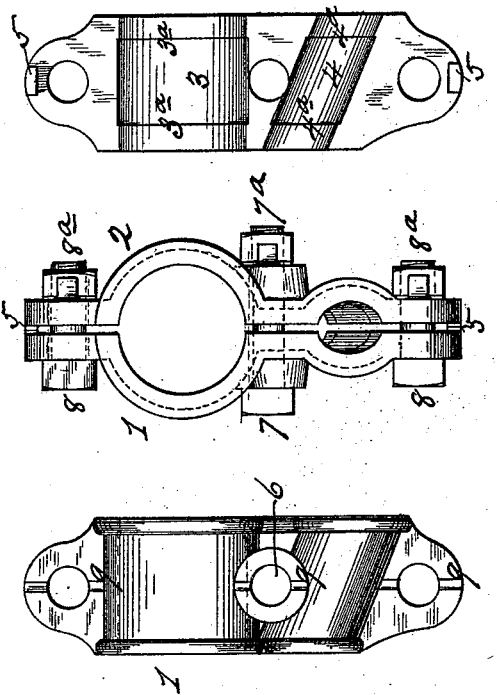
Witnesses:
Inventor:
Henry B. Robischung

UNITED STATES PATENT OFFICE.

HENRY B. ROBISCHUNG, OF KALAMAZOO, MICHIGAN, ASSIGNOR TO THE CHICAGO RAILWAY EQUIPMENT COMPANY, OF CHICAGO, ILLINOIS.

BRAKE-BEAM AND REINFORCING-CLAMP THEREFOR.

SPECIFICATION forming part of Letters Patent No. 528,238, dated October 30, 1894.

Application filed March 26, 1894. Serial No. 505,162. (No model.)

*To all whom it may concern:*

Be it known that I, HENRY B. ROBISCHUNG, a citizen of the United States, residing at Kalamazoo, in the county of Kalamazoo and State of Michigan, have invented certain new and useful Improvements in Brake-Beams and Reinforce-Clamps Therefor; and I hereby declare the following to be a full, clear, and exact description of the same, reference being had to the accompanying drawings, in which—

Figure 1, is a plan view of a trussed brake beam with reinforce clamps applied. Fig. 2, is a detached edge view of the clamp looking in the direction of the arrow, Fig. 1. Fig. 3, is an outside plan view of one of the clamp sections, and Fig. 4, is an inside view of the opposite clamp section.

Like symbols refer to like parts wherever they occur.

My invention relates to the construction of trussed brake beams, and has for its object, the reinforcing of the structure so as to insure the maximum of strength for the cross section of the tension member of the beam.

In trussed brake beams, as commonly constructed the tension member or truss rod is threaded for some distance from its ends in order that the compression and tension members may be combined and adjusted by means of nuts which is the simplest form of connection, and best adapted for adjusting the strains on the structure. As a consequence of threading the ends of the tension member (or truss rod) the cross sectional area of the tension member at its ends is reduced so that when the elastic limit of the tension member is reached there is a tendency to stretch in the threaded ends with a corresponding let down in the structure, so that the structure as a whole is no stronger than its weakest portion—viz., its threaded ends. To overcome this objection I reinforce the beam at points adjacent to its ends by combining therewith clamps which bite or take hold on both tension and compression members so firmly as to prevent the movement of either, thus intercepting the strain transmitted from the post or strut and preventing the stretching of the threaded ends of the tension member, and such a combination of reinforcing clamp with the tension and compression members of a trussed brake-beam, embodies the first feature of my invention.

In constructing the clamps I prefer to form them of parallel sections—right and left—with a seat or seats for the member to be held therein, said seat or seats being of less transverse area than the member to be gripped, or in other words with interior biting edges or projections which take hold on the tension and compression members and prevent the movement of said members within the clamp, and such a construction, or its equivalent embodies a second feature of my invention.

By preference the clamp sections will be connected by a centrally placed bolt and nut, and one or both of the sections will have on the inner face limit lugs which prevent the contact of the sections and utilize the spring of the clamp sections to more efficiently grasp the tension and compression members—and such a construction and combination—as well as other details of construction, which will hereinafter more fully appear, embody minor features of my invention.

I will now proceed to describe my invention more fully, so that others skilled in the art to which it appertains may apply the same.

In the drawings A indicates the compression member, B the strut or post, and C the tension member of a trussed metallic brakebeam—the tension and compression members being united with each other, or with each other and with the head D, by means of bolt and nut connections wherein the tension member is threaded at the ends which pass through the ends of the compression member, or heads (as indicated by dotted lines, Fig. 1) and the parts secured by nuts *c*.

As the ends of the tension member are necessarily reduced in threading them for the reception of the nuts, the strength of the structure is reduced to the extent of such reduction of its area in cross section, and when the elastic limit of the tension member is reached there is a tendency in the beam to give down by the stretching of the threads. Therefore, I connect the tension member C to the compression member A adjacent to the intersection of said parts by a transverse reinforce clamp F, which is not simply a guard clamp of the general character heretofore employed—or one wherein the tension member C can move—but is of a nature to bite on both tension and compression members and prevent the movement of either within the clamp. To this end I prefer to construct said reinforce clamps of two lateral and parallel sections 1 and 2 which are counterparts, except that one is a right and the other a left, said sections having each two converging countersunk seats 3, 4, for the reception of the compression and tension members of the beam. This countersinking of the seats 3 and 4 will produce biting edges 3ª 4ª adapted to bite upon or indent the tension and compression members and prevent them from slipping in or drawing through the clamp, but in lieu of said construction the inner surfaces of the clamp may be roughened or provided with points or projections. Upon the inner faces of the sections and near the extremities of the clamp offsets or limit lugs 5, 5, may be provided to prevent the contact of the clamp sections; and midway the clamp—between the seats 3 and 4 for the tension and compression members, bolt orifices 6 are provided for a through bolt 7 whereby the clamp sections are sprung toward each other to utilize the resiliency of the metal and insure a perfect grip of the tension member C and compression member A. In addition to the central or main bolt 7 and its nut 7ª outside bolts 8 with suitable nuts 8ª may be employed; and each nut seat may be transversely grooved as at 9 to receive a nut lock or washer—if desired.

Reinforce clamps F having the characteristics, and preferably the construction, hereinbefore specified, are applied to a truss-beam one at each end and adjacent to the ends of said beam, the two sections of the clamp being forced together by the bolt and nut 7, 7ª (and bolts and nuts 8, 8ª if used) until the spring or yield of the sections has insured such a grip of the edges 4ª upon the tension rod C that the latter cannot move or draw through the clamp, and the strain or force transmitted from the strut B through the tension member C—or truss rod—will be intercepted by the clamp and transmitted to the compression member A, thus relieving the tension member of excessive strain at its threaded end.

I am aware that finger guard clamps and cross-braces have been heretofore applied to trussed brake-beams adjacent to the brakeheads for the support of finger guard and the attachment of hangers and that such clamps will in a measure support the beam against cross strains, but so far as I am aware no clamp has heretofore been constructed, applied and adjusted to a trussed brake-beam as to bind the tension member, intercept the strains thereon, and prevent the stretch of its threaded ends when the elastic limit of the tension member is reached.

Therefore, having fully described the nature and operation of my invention, what I claim, and desire to secure by Letters Patent, is—

1. In a trussed metallic brake-beam, the combination with a compression member, and a tension member having threaded ends, of transverse reinforce clamps provided with gripping surfaces which prevent the longitudinal movement or slipping of the tension member therein, substantially as and for the purposes specified.

2. A reinforce clamp for trussed brake-beams, said clamp composed of parallel sections having a seat for the compression member, a countersunk seat for the tension member, and means for causing the clamp sections to bind on the said compression and tension members; substantially as and for the purposes specified.

3. A reinforce clamp for trussed brake beams, said clamp composed of parallel sections, having seats for the tension and compression members of a beam, said seats provided with gripping surfaces and bolt holes located between said seats and adapted to receive a clamping bolt, substantially as and for the purposes specified.

4. A reinforce clamp for trussed brake beams, said clamp composed of parallel sections having seats for the compression and tension members of a brake-beam, said seats provided with gripping surfaces, bolt holes between said seats, and limit lugs to the outside of said seats, substantially as and for the purposes specified.

5. A reinforce clamp for trussed brake-beams, composed of parallel sections having each a series of three bolt holes, and intermediate seats for the compression and tension members of a brake-beam; substantially as and for the purposes specified.

6. A reinforce clamp for trussed brake-beams, said clamp composed of parallel sections having each a series of three bolt holes, and intermediate countersunk seats for the compression and tension members of a brake-beam; substantially as and for the purposes specified.

In testimony whereof I affix my signature, in presence of two witnesses, this 22d day of March, 1894.

HENRY B. ROBISCHUNG.

Witnesses:
E. B. LEIGH,
E. T. WALKER.